Feb. 27, 1923.
N. H. DE GRAAF
PROCESS OF MAKING COCOA PRODUCTS
Filed Dec. 5, 1918
1,447,013
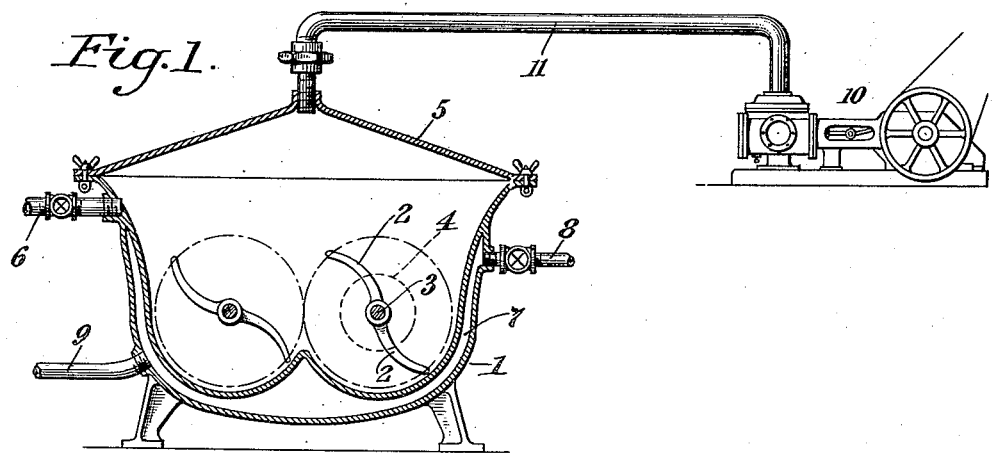
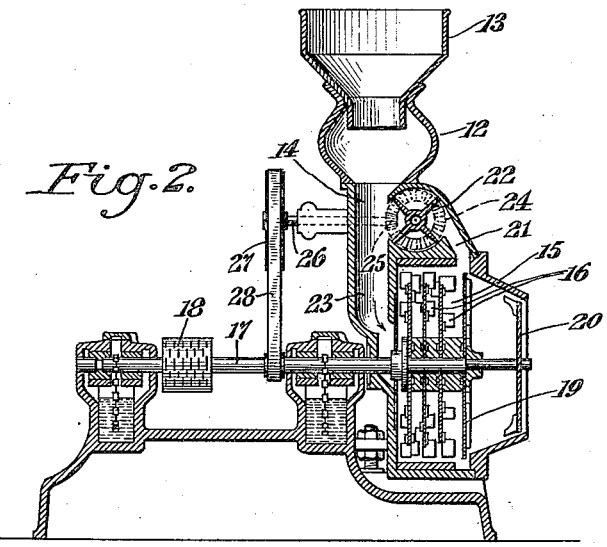
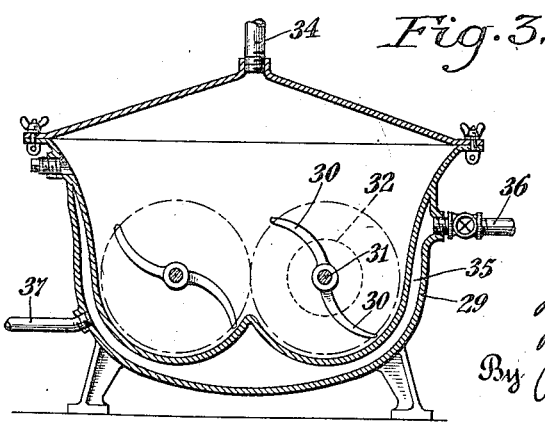

Patented Feb. 27, 1923.

1,447,013

UNITED STATES PATENT OFFICE.

NIC H. DE GRAAF, OF MIDDLETOWN, NEW YORK.

PROCESS OF MAKING COCOA PRODUCTS.

Application filed December 5, 1918. Serial No. 265,326.

*To all whom it may concern:*

Be it known that I, NIC H. DE GRAAF, of Middletown, in the county of Orange, and in the State of New York, have invented a certain new and useful Improvement in Processes of Making Cocoa Products, and do hereby declare that the following is a full, clear, and exact description thereof.

My invention relates to a process by means of which cocoa products of many different kinds may be made in an advantageous manner.

Hitherto in making cocoa products, it has been necessary to utilize a process having many different stages and involving many different operations, and which required the use of a correspondingly large equipment of apparatus that was expensive and costly in upkeep, as well as in operation.

For example, in making sweet milk chocolate, it was customary previously to condense fluid milk by evaporation with or without the addition of sugar in a vacuum pan; then to remove the condensed milk to a grinding, mixing or beating machine, into which powdered sugar, that is ground sugar, may or may not be introduced, and where the materials are worked until dry; then to remove the dry milk and introduce the same into a mixing machine with cocoa-liquor, which is roasted cocoa nibs that have been put through a grinding machine, or cocoa cake, which is the press cake left after the fatty material has been partly pressed from cocoa nibs, cocoa butter and powdered sugar; then to remove the product and pass the same through rollers; then to mix cocoa butter therewith in a mixing or grinding machine; then to pass the ground product through several additional sets of rollers; thereafter to mix again the resulting product with cocoa butter; and finally to pass this product through a chaser, a form of grinding mill, and in conches,—that is a rubbing machine. Other cocoa products, such as sweet milk chocolate coating, ground sweet milk chocolate, sweet milk cocoa powder, milk cocoa powder, milk chocolate, milk chocolate coating, plain chocolate and plain chocolate coating, were made with a similar complexity and elaborateness of operations and apparatus.

The object of my invention is to provide a process in which the number of operations is very much lessened, and in which the quantity of apparatus as well as the cost of the same and cost of keeping up and operating the same, is decreased to a marked degree. More particularly, the object of my invention is to provide a process of this character by means of which cocoa products of many different kinds may be made, as for example, the following: sweet milk chocolate, sweet milk chocolate coating, ground sweet milk chocolate, sweet milk cocoa powder, milk cocoa powder, milk chocolate, milk chocolate coating.

The object of my invention is, furthermore, to eliminate many of the operations previously used in the manufacture of these products, as well as the apparatus that was required for the same. Further objects of my invention will appear from the detailed description thereof contained hereinafter.

While my invention is capable of being carried out in many different ways and in connection with many different types of apparatus, for the purpose of illustration I have shown only one type of apparatus for use in connection therewith in the accompanying drawings, in which;

In the drawings, Figure 1 is a section of a jacketed vacuum evaporator and mixer; Figure 2 is a section of a beater; and Figure 3 is a section of a jacketed mixer.

For example, in the maunfacture of sweet milk chocolate and sweet milk chocolate coating in accordance with my invention about 20 pounds of raw or roasted cocoa nibs, or in partial substitution therefor a quantity of cocoa cakes taken from a cocoa press which has been used to partially express the cocoa butter therefrom, may be mixed with about 44 pounds of coarse cane sugar and, say, 140 pounds of fluid milk which may have been partly condensed, if desired, and which may be warm or cold. The above may be introduced into any convenient mixer or kneading apparatus adapted to mix, knead and grind the contents. This may be in the form of a horizontal barrel 1, having a plurality of stirring arms 2 located upon a shaft 3, driven by a pulley 4 from any suitable source of power. The barrel 1 may have a removable head 5 for the introduction and removal of the solid materials treated, and a suction pipe 6 for the introduction of the liquid materials. As shown the barrel 1 is also provided with a heating and cooling jacket 7, extending around all sides of the same, which jacket may be provided with inlet and outlet pipes 8 and 9 for a heating or cooling medium of any desired character. Furthermore, said barrel is shown connected with a vacuum pump 10 by means of a pipe 11. The milk which is introduced is preferably added gradually, as the water evaporates in the drum. Preferably, the mixing apparatus is first warmed before the introduction of the materials treated. The vacuum is also kept at a high degree, preferably at about 28 inches of mercury, while a degree of heat is applied, which is preferably not allowed to rise above about 142° F. during the treatment in the mixing apparatus if soluble milk paste is to be obtained. If desired, the cocoa nibs or cocoa cakes may be added last, after the remainder of the constituents have been treated to some extent in the mixing apparatus. The treatment of the above mentioned constituents in the mixing apparatus is ordinarily continued until a dry coarse powder is obtained. Thereafter, the product is removed to a pulverizer 12, shown as having a hopper 13 adapted to supply the materials by a conduit 14 to a pulverizing chamber 15 which may be provided with a plurality of rotary arms 16 located on a shaft 17, and driven by, e. g., a pulley 18 from any suitable source of power. At one side of the chamber 15, there is a disc 19, adapted to allow only the finer materials to escape around the edge thereof, and to finally pass out around an outer disc 20, both of said discs 19 and 20 being preferably located on a shaft 17. The coarser materials are drawn up through a passageway 21 by a rotary device 22, and are returned by a conduit 23, and are thus returned to the pulverizing chamber 15. The fan 22 may be driven by a gear 24 meshing with a gear 25, shown as mounted on a shaft 26, having a pulley 27 which may be rotated by a belt 28 on the shaft 17. From the pulverizer 12, the pulverized materials may be transferred to a kneading machine having, e. g., the form of a horizontal drum 29, which is shown as having a plurality of arms 30 located on a shaft 31 driven by a pulley 32 from any suitable source of power. The product while in the drum 33 may be supplied with an additional quantity of cocoa butter through a covered inlet 34, the amount of cocoa butter added being preferably about 25% of the weight of the powder in the drum, for sweet milk chocolate. For sweet milk chocolate coating, I use about 33% cocoa butter, but if cocoa cakes are used, I may add in addition the amount of the cocoa butter pressed out of the nibs. Preferably, the cocoa butter is added to the powder gradually while the powder is being kneaded therein. If it is desired to have the sweet milk chocolate thinner, additional cocoa butter is also added here to the amount desired. However, the kneading machine is preferably operated for about two hours after the last amount of the cocoa butter has been added, in order to obtain the requisite smoothness of the product. This drum may be, furthermore, provided at all sides thereof with a heating and cooling jacket 35, having inlet and outlet pipes 36 and 37 for the heating medium, the temperature being maintained thereby at 95° F., during the treatment.

For making ground sweet milk chocolate, the operation may be the same as previously described for sweet milk chocolate, except that the constituents introduced into the mixer 1 comprise 140 pounds of fluid milk, 39 pounds of granulated cane sugar, 15 pounds of raw or roasted cocoa nibs and 30 pounds of the cocoa cakes obtained from a cocoa press, as previously described, and except that the operation may be regarded as finished when the product comes from the pulverizer 12.

For making sweet milk cocoa powder the operation may be the same as in making ground sweet milk chocolate, except that the constituents introduced into the mixing apparatus 1 may comprise 140 pounds of fluid milk, 16 pounds of granulated cane sugar and 16 pounds of cocoa cakes obtained from a cocoa press, as above described.

For making milk cocoa powder, the operation may be the same as in making ground sweet milk chocolate, except that the constituents introduced into the mixing apparatus 1 are comprised of 140 pounds of fluid milk and 16 pounds of cocoa cakes.

For making milk chocolate and milk chocolate coating, the operations may be the same as in making sweet milk chocolate and sweet milk chocolate coating, except that initially the constituents introduced into the mixing apparatus 1 are preferably comprised of 140 pounds of fluid milk and 16 pounds of raw or roasted cocoa nibs, or 10 pounds of cocoa cakes.

Furthermore, if desired, in making ground sweet milk chocolate, sweet milk cocoa powder and milk cocoa powder, the product coming from the pulverizer 12 may be sifted, if desired.

It is to be understood also that many changes may be made in the proportions of the constituents. For example, in making sweet milk chocolate and sweet milk chocolate coating, as well as milk chocolate and milk chocolate coating, cocoa cakes can be substituted for the cocoa nibs up to 60% of the weight of the cocoa nibs and 40 pounds additional of cocoa butter for every 60 pounds of cocoa cakes used may be added.

While I have described my invention above in detail, I wish it to be understood that many changes may be made therein without departing from the spirit thereof.

Claims:

1. The process of making a food product comprising grinding a cocoa product with another constituent of the food while evaporating water therefrom.

2. The process of making a food product comprising grinding a cocoa product with another constituent of the food while evaporating water therefrom under a partial vacuum.

3. The process which comprises making a cocoa product by grinding cocoa nibs or cocoa cakes, and at the same time mixing therewith fluid milk while applying a vacuum.

4. The process which comprises making a cocoa product by grinding cocoa nibs or cocoa cakes, and at the same time mixing therewith coarse sugar and fluid milk while applying a vacuum.

5. The process which comprises making a cocoa product by grinding cocoa nibs or cocoa cakes, and at the same time mixing therewith coarse sugar and fluid milk while applying a vacuum and heat.

6. The process which comprises making a cocoa product by grinding cocoa nibs or cocoa cakes, and at the same time mixing therewith fluid milk while applying a vacuum, and then pulverizing the product.

7. The process which comprises making a cocoa product by grinding cocoa nibs or cocoa cakes, and at the same time mixing therewith coarse sugar and fluid milk while applying a vacuum, and then pulverizing the product.

8. The process which comprises making a cocoa product by grinding cocoa nibs or cocoa cakes, and at the same time mixing therewith the other constituents, then pulverizing the product, and then subjecting the product to a kneading action.

9. The process which comprises making a cocoa product by grinding cocoa nibs or cocoa cakes, and at the same time mixing therewith fluid milk while applying a vacuum, then pulverizing the product, and then subjecting the product to a kneading action with the addition of cocoa butter.

10. The process which comprises making a cocoa product by grinding cocoa nibs or cocoa cakes, and at the same time mixing therewith coarse sugar and fluid milk while applying a vacuum, then pulverizing the product, and then subjecting the product to a kneading action with the addition of cocoa butter.

11. The process which comprises making a cocoa product by grinding cocoa nibs or cocoa cakes, and at the same time mixing therewith coarse sugar and fluid milk while applying a vacuum and heat, then pulverizing the product, and then subjecting the product to a kneading action with the addition of cocoa butter.

In testimony that I claim the foregoing I have hereunto set my hand.

NIC H. DE GRAAF.

Witnesses:
ARTHUR WRIGHT.
LILLIAN M. COOKE.